Oct. 14, 1969 SATOSHI SHIMADA ET AL 3,472,951

TWO-WAY TELEVISION SYSTEM UTILIZING A COMMON SYNCHRONIZATION SOURCE

Filed Nov. 1, 1965 2 Sheets-Sheet 1

Inventors
Satoshi Shimada
Shigeru Nishigaki by Hill, Sherman, Meroni, Gross & Simpson Attys.

Inventors
Satoshi Shimada
Shigeru Nishigaki by Hill, Sherman, Meroni, Gross & Simpson Attys.

United States Patent Office 3,472,951

Patented Oct. 14, 1969

3,472,951

TWO-WAY TELEVISION SYSTEM UTILIZING A COMMON SYNCHRONIZATION SOURCE

Satoshi Shimada and Shigeru Nishigaki, Tokyo, Japan, assignors to Sony Corporation, Tokyo, Japan, a corporation of Japan Filed Nov. 1, 1965, Ser. No. 505,793
Claims priority, application Japan, Nov. 4, 1964, 39/62,640
Int. Cl. H04n 5/38
U.S. Cl. 178—6.8 13 Claims

ABSTRACT OF THE DISCLOSURE

A television system in which simultaneous video television may be transmitted and received with conventional transmitters and receivers and which uses a single transmission media and a single synchronizing means.

This invention relates to a television system and more particularly to a simultaneous video television system in which two or more video receiving-and-sending stations may simultaneously use a single transmission media. In one application the invention is especially useful in closed circuit television. The invention is also especially adaptable to a closed circuit telephone-video system.

In prior simultaneous video systems at least two cables or transmission loops between the stations have been required. That is, one transmission line between the stations was required to transmit the image sent from each station to the other. While such systems are adequate in many applications, the initial cost of such a system is high and, as the required equipment tends to be complicated, the system maintenance is expensive.

It is therefore an object of the present invention to provide a television system of simplified and economic construction and operation.

It is the primary object of the present invention to provide a new and improved television system which can be employed in a variety of applications.

It is an object of the invention to provide a new and improved television system which can be employed in a closed circuit television which employs only a single transmission cable for the sending of several images from two or more sending stations.

It is another object of the invention to provide novel and better television systems which may be utilized in a closed circuit television system to achieve the result that a plurality of images from different sending stations may be transmitted over a single cable and one or more of the transmitted images may be selectively monitored at one or more receiving stations.

It is another object of the invention to provide a television system which is adaptable to telephone-video use which employs conventional elements in a simple and easily achieved manner to achieve a materially simplified and economical telephone-video system.

In achieving these objects a television system is provided employing at least two stations, each having an image pickup device and an image reproducing device. These devices are provided with synchronization means producing synchronizing pulses and are interconnected by a common transmission medium, such as a single cable or a single channel, and the image pickup devices are operated so as to pick up images during different segments of the periods between synchronizing pulses.

The organization and manner of operation of the invention, together with further objects and advantages thereof may best be understood by reference to the following description taken in connection with the accompanying drawings, in the several figures of which like reference numerals identify like elements, and in which an exemplification of the invention is illustrated.

Figure 1:
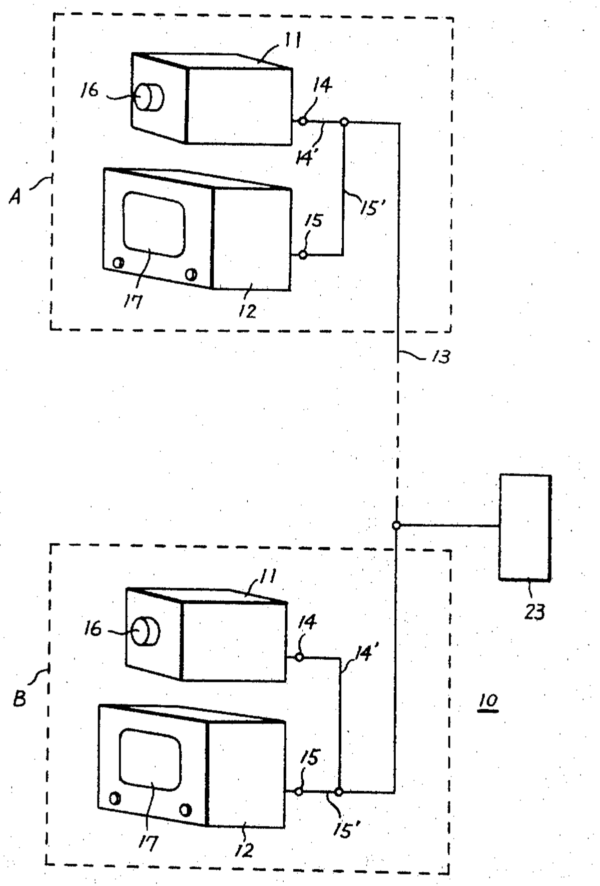
FIG. 1 is a general schematic diagram illustrating a simultaneous video transmitting system embodying the principles of the invention.

Referring now to FIG. 1 there is depicted a two-station cable-connected television system generally indicated by the numeral 10. The system 10 includes a first and a second combined pickup and sending station generally indicated by the letters A and B, respectively. Each of the stations A and B comprise an image pickup device 11 and an image reproduction device 12. The image pickup device 11 may be, as depicted, an entirely conventional television camera having an optical lens system 16. The device or camera 11 includes a pickup tube such as the vidicon, the iconoscope, the image orthicon, or the like which converts the image from the lens system 16 into a transmittable electrical waveform which is supplied at an output 14. The image reproduction device 12 may be a conventionally constructed television receiver having a signal input terminal 15 and an image displaying cathode ray tube 17.

When the system 10 is adapted to be a telephone-video system, the camera 11 and receiver 12 of each station A and B are placed facing a common area of use. In this area, the user at one station may stand or sit so as to be seen and to see the user at the other station.

The image signals of the pickup device 11 at the station A must be transmitted to the reproducing device 12 at the station B. On the other hand, the image signals of the pickup device 11 at station B must be transmitted, to the reproducing device 12 at station A.

According to this invention, these image signals are transmitted simultaneously with only a single transmission media, the electric input transmitting cable 13. That is, at each station A, B, the output terminal 14 of the pickup device 11 and the input terminal 15 of the image reproducing device 12 are coupled to the cable 13 via, respectively, electrical lines 14' and 15' which are connected to one another, and this common connection is connected to one end of the transmission cable 13 which interconnects the two stations. Thus, all four devices are intercoupled via a single transmission cable 13.

Synchronizing pulses, the conventional horizontal and vertical synchronizing pulses, for the pickup devices 11 and the reproducing devices 12, are supplied from a common synchronizing means or source 23 coupled to the cable 13. The synchronizing source 23 may be located at any convenient place and may be entirely conventional. The output terminal 14 of the pickup devices 12 serves as the input terminal for the devices illustrated.

Figure 2:
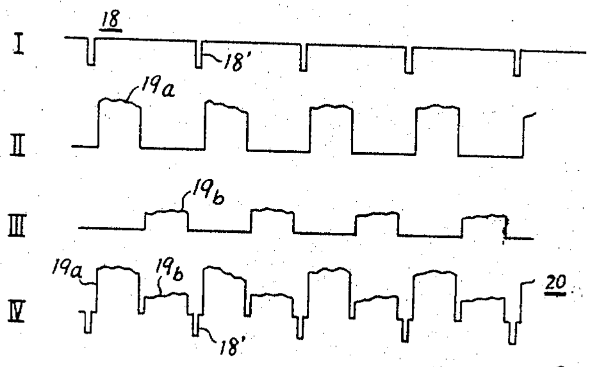
FIG. 2 is a number of waveforms useful in explaining the operation of the system of FIG. 1.

Referring to FIG. 2–I, there is depicted the output of synchronizing means 23 a waveform 18. This conventional waveform comprises a succession of negative pulses 18' at the line frequency and superimposed pulses (not shown) at the field frequency.

Figure 3:
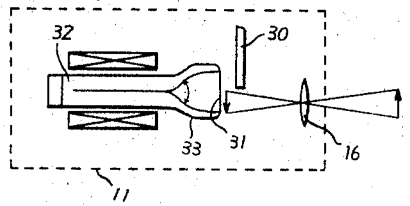
FIG. 3 is a top plan view of part of the apparatus of FIG. 1.
Figure 4:
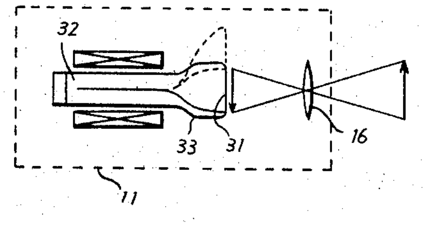
FIG. 4 is a top plan view, similar to FIG. 3 of an alternative construction to that of FIG. 3.

In accordance with the invention the image pickup devices 11 of station A are modified to pick up at substantially only during the left one-half of the horizontal sweep. This can be effected, as shown in FIG. 3, by inserting a mask 30 over the right one-half of the target area 31 of a vidicon 32 or other tube of the camera 11. An alternative method of achieving this end is illustrated in FIG. 4 in which the horizontal scan of the vidicon 32 is magnified to twice the horizontal dimension of the target 31 and the phantom half of the horizontal scan is caused to overscan, that is, fall not on the target, on the right side of the ultor 33 of the tube 32. In either of these ways a signal will be generated only during the left half of the horizontal sweep and no signal will be generated during the right one-half of the horizontal sweep. Thus, an output waveform of the general shape of waveform 19*a* of FIG. 2–II will be generated.

The pickup tube of station B's image pickup device 16 is operated in a similar manner so as to sweep only during substantially the right half of the horizontal sweep. In this manner a signal waveform of the general shape of waveform 19*b* of FIG. 2–III is generated. That is, the video signals 19*a* are aligned at a first half of the period between vertical synchronizing signals 18′, and video signals 19*b* are aligned at the latter half of the period between synchronizing signals 18′.

The signal actually present on the cable 13 is the addition of these three waveforms. This composite waveform is of the general form of the waveform 20 depicted in FIG. 2–IV. It should be noted that the respective signals 19*a* and 19*b* occupy slightly less than one-half of the horizontal sweep periods so as to prevent cross-talk between the two signals.

The image reproducing devices 12 of the stations A and B have their input terminals 15 connected to the cable 13 and consequently receive the composite waveform 20 of FIG. 2–IV therefrom. Also in accordance with the invention, the image reproducing device 12 of station B is constructed so as to display on the tube 17 only the left one-half of the horizontal sweep or the portion 19*a* of the waveform 20 generated by pickup device 11 of station A. Likewise, the image reproducing device 12 of station A is constructed so as to display on the tube 17 only the right one-half of each horizontal sweep or the portion 19*b* of the waveform 20 generated by the pickup device 11 of station B. This may be accomplished in the manner of FIG. 3 by masking part of the screen surface of the tube 17 but is preferably accomplished by causing the horizontal sweep to be twice the size of the screen and to place the phantom portion on the right or left side of the ultor of the tube 17.

It should be noted that if the overscan method of image pickup is used with conventional scan image reproduction, the image is distorted or reduced in width by one-half in the reproduction. In some applications this is permissible, however, in most cases corrective measures should be taken. It is preferred that a consistent system of image pickup and reproduction be used, that is, either both or neither of the pickup and reproducing devices should employ overscanning to prevent distortion.

Figure 5:
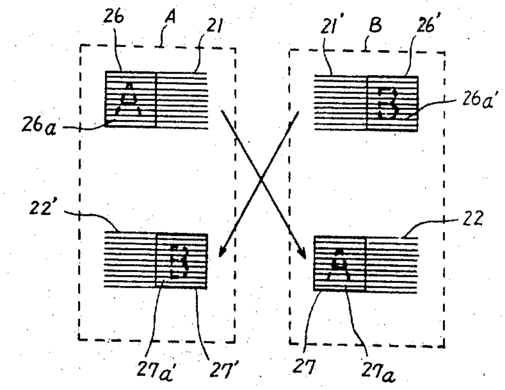
FIG. 5 is a pictorial representation of television video scanned fields illustrating video picture reproduction in the system of FIGS. 1 and 2.

Referring now to FIG. 5 there is depicted the field swept out and reproduced at the two stations A and B. At the station A, the television camera 11, either by masking or overscanning, picks up an image 26*a* only on the left one-half 26 of the field 21. At the station B, its television camera 11 picks up an image 26*a′* from only the right one-half 26′ of the scanned field 21′. The image reproduction device 12 of station B sweeps out a field 22 received from station A and displays on the tube 12 by either masking or overscanning, only the left one-half 27 and the image 27*a* corresponding to the field half 26 and image 26*a*. In a similar manner, the image reproducer 12 of station A displays only the right one-half 27′ and image 27*a′* corresponding to the field half 26′ and image 26*a′* of station B.

Although the image reproducing devices 17 have been described above as reproducing only the images transmitted from the other station, it is obvious that the entire signal 20 containing both transmitted images of both stations is present at both inputs 15 of the reproducers 12 of both stations A and B. Thus, it is possible for the image reproducing device 12 to display both pictures transmitted from both stations A and B. That is, either station could monitor its own transmission. This could be done, for example, by allowing the entire field 22 or 22′ to be traced out upon the image displaying screen of the tube 17.

It should be noted that additional image reproducers 12 may be readily affixed to the cable 13 to receive and reproduce one or the other or both of the pictures transmitted from the two stations. Thus, for example, the invention may be readily adapted to a closed-circuit subscription television system to provide the choice of several shows to the subscriber.

Figure 6:
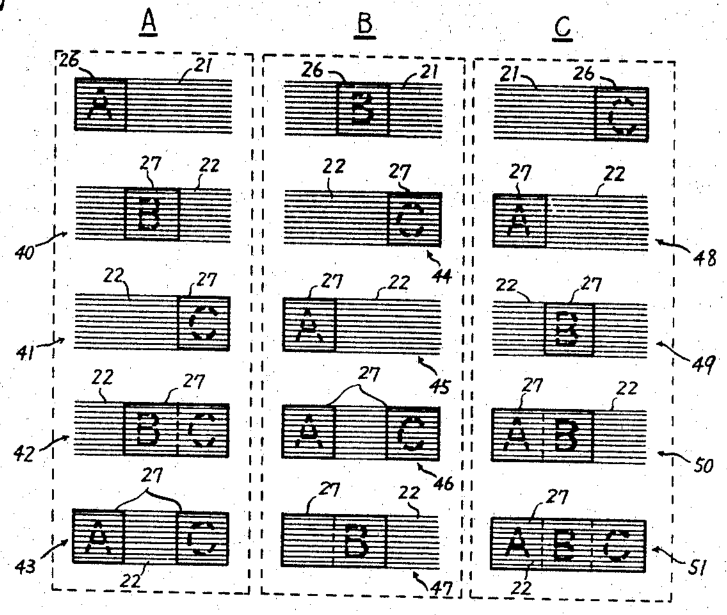
FIG. 6 is a pictorial representation similar to that of FIG. 5 of a second embodiment of the invention illustrating various applications of the inventive system.

Although the invention has been described in conjunction with a two station system, it may be employed in a system employing three or more stations. Referring to FIG. 6, there is illustrated the scanning field of three stations A, B and C. These stations are, as in FIG. 1, connected by a common transmission cable and have a common synchronizing signal source. At the first station A, only the one-third of the field 21 is used to pick up a picture 26. Likewise, station B uses the central one-third of its scan field 21 to pick up a picture 26, and station C uses the right one-third of its scan field 21.

In this three-station system, station A may receive and display only the image transmitted from station B, as shown at 40, or it may receive and display only the image transmitted from station C, as shown at 41. Station A may also display both stations B and C transmitted images, as shown at 42, or it may monitor its own transmission and display one or the other or both of the transmissions of stations B and C. As an example, it may display or monitor its own transmission and display the transmission of station C, as shown at 43. Station B may similarly display only the transmittal of station C (44) or A (45) or both (46). It may also monitor its own transmittal and display one or both of the transmittals of stations A and C, for example, that of station A as shown at 47. Also station C may display only the transmittal of one of the other two stations, as at 48 and 49, or it may display both as at 50. Station C may similarly monitor its own transmittal as well as display one or both (as at 51) of the other station's transmittals.

As is now apparent, a new and improved television system has been described which can be employed in a variety of applications. The described invention is of simplified and economic construction and operation in that it eliminates the requirement for a plurality of transmission cables or channels and provides for using a common synchronizing signal source for two or more transmittal-receiving stations.

It will be apparent that many modifications and variations may be effected without departing from the scope and the novel concepts of the present invention.

We claim as our invention:

1. A television system comprising:

a first station having a first image pickup device for producing a video output signal and a first image reproducing device for reproducing an image from an input signal;

a second station having a second image pickup device for producing a video output signal and a second image reproduction device for reproducing an image from an input signal;

an electrical circuit interconnection between said first and said second station;

a single synchronizing means for producing a synchronizing signal including horizontal synchronizing pulses connected to deliver said signal to said electrical circuit interconnection;

means for intercoupling said circuit interconnection and said first pickup device and said first reproducing device at said first station, means for intercoupling said circuit interconnection and said second pickup device and said second reproducing device at said second station; and means for operating said pickup devices so as to pick up an image during different segments of the periods between said horizontal synchronizing pulses of said synchronizing signal.

2. A television system comprising:

a first image pickup device having an output terminal for producing a video signal at said terminal;

a second image pickup device having an output terminal for producing a video signal at said terminal;

an image reproducing device, having an input terminal for reproducing an image from a video signal applied at said input terminal;

a single source of synchronizing pulses including horizontal synchronizing pulses;

a single transmission medium;

means for coupling said output signal of each of said pickup devices, the input of said reproducing device and the synchronizing signal of said source to said medium; and means at each of said pickup devices operatively connected thereto for having said devices pick up an image at only different portions of the period between said horizontal synchronizing pulses.

3. The television system as claimed in claim 2 in which said image pickup devices each includes a television pickup tube and said means at one of said pickup devices includes a mask covering a portion of the image input of said tube.

4. The television system as claimed in claim 2 in which said image pickup devices each includes a television pickup tube and said means at one of said pickup devices includes means for causing said tube to horizontally overscan for the same position of each horizontal scan.

5. The television system as claimed in claim 2 in which said medium comprises a single electrical cable interconnecting said first and said second pickup devices.

6. A television system comprising:

a first station including an image pickup device for producing a video signal at an output terminal, and an image reproducing device for reproducing an image from a video signal received at an input terminal of said reproducing device;

a second station including an image pickup device for producing a video signal at an output terminal, and an image reproducing device for reproducing an image from a video signal received at an input terminal of said reproducing device;

a signal transmitting cable interconnecting said first station and said second station;

a single source of synchronizing signals, including horizontal synchronizing pulses electrically coupled to said cable;

means electrically coupling said output terminal of said pickup device of said first station to said cable;

means electrically coupling said output terminal of said pickup device of said second station to said cable;

means electrically coupling said input of said image reproducing device of said first station to said cable;

means electrically coupling said input of said image reproducing device of said second station to said cable;

means at said pickup device of said first station for having said pickup device pick up an image at only a first portion of each horizontal scan period between said horizontal synchronizing pulses; and means at said pickup device of said second station for having said pickup device pick up an image at only a second portion, different from said first portion, of each horizontal scan period between said horizontal synchronizing pulses.

7. The television system as claimed in claim 6 in which said image pickup devices each includes a television pickup tube and said means at one of said pickup devices includes a mask covering a portion of the image input of said tube.

8. The television system as claimed in claim 6 in which said image pickup devices each includes a television pickup tube and said means at one of said pickup devices includes means for causing said tube to horizontally overscan for the same position of each horizontal scan.

9. The television system as claimed in claim 6 in which said first portion of each horizontal scan is approximately the first one-half of said scan and said second portion of said each horizontal scan is approximately the second one-half of said scan.

10. The television system as claimed in claim 6 in which said first and second portions are each different approximately one-third of said each horizontal scan.

11. The television system as claimed in claim 6 in which said reproducing device of said first station reproduces and displays the image picked up by said pickup device of said second station and said reproducing device of said second station reproduces and displaces the image picked up by said pickup device of said first station.

12. A television system comprising:

a first station including an image pickup device for producing a video signal at an output terminal, said pickup device including a television camera tube, and an image reproducing device, said image reproducing device including a display cathode ray tube, for reproducing an image from a video signal received at an input terminal of said reproducing device;

a second station remotely located from said first station including a television camera tube, and an image reproducing device, said image reproducing device including a display cathode ray tube, for reproducing an image from a video signal received at an input terminal of said reproducing device;

a signal transmitting cable interconnecting said first station and said second station;

a single source of synchronizing signals including horizontal synchronizing pulses electrically coupled to said cable for transmitting said synchronizing signals through said cable to said stations;

means electrically coupling said output terminal of said pickup device at said first station to said cable for utilizing said synchronizing signals and for transmitting said video signal to said cable;

means electrically coupling said output terminal of said pickup device of said second station to said cable utilizing said synchronizing signals and for transmitting said video signal to said cable;

means electrically coupling said input of said image reproducing device of said first station to said cable for reproducing and displaying, using said synchronizing signals and at least part of the video signals transmitted on said cable, an image;

means electrically coupling said input of said image reproducing device of said second station to said cable, for reproducing and displaying, using said synchronizing signals and at least part of the video signals transmitted on said cable, an image;

means at said pickup device of said first station for having said pickup device pick up an image at only a first portion of each horizontal scan period between said horizontal synchronizing pulses, said first portion being approximately equal to the first one-half of said scan; and means at said pickup device of said second station for having said pickup device pick up an image at only a second portion, different from said first portion, of each horizontal scan period between said horizontal synchronizing pulses, said second portion being approximately equal to the second one-half of said scan.

13. A television system comprising:

a first station including an image pickup device for producing a video signal at an output terminal, said pickup device including a television camera tube and an image reproducing device, said image reproducing device including a display cathode ray tube for reproducing an image from a video signal received at an input terminal of said reproducing device;

a second station remotely located from said first station including an image pickup device for producing a video signal at an output terminal, said pickup device including a television camera tube and an image reproducing device, said image reproducing device including a display cathode ray tube for reproducing an image from a video signal received at an input terminal of said reproducing device;

a signal transmitting cable interconnecting said first station and said second station;

a single source of synchronizing signals, including horizontal synchronizing pulses electrically coupled to said cable for transmitting said synchronizing signals through said cable to said stations;

means electrically coupling said output terminal of said pickup device at said first station to said cable for utilizing said synchronizing signals and for transmitting said video signal to said cable;

means electrically coupling said output terminal of said pickup device of said second station to said cable for utilizing said synchronizing signals and for transmitting said video signal to said cable;

means electrically coupling said input of said image reproducing device of said first station to said cable for reproducing and displaying, using said synchronizing signals and at least part of the video signals transmitted on said cable, an image;

means electrically coupling said input of said image reproducing device of said second station to said cable for reproducing and displaying, using said synchronizing signals and at least part of the video signals transmitted on said cable, an image;

means at said pickup device of said first station for having said pickup device pick up an image at only a first portion of each horizontal scan period between said horizontal synchronizing pulses, said first portion being approximately equal to the first one-third of said scan; and means at said pickup device of said second station for having said pickup device pick up an image at only a second portion, different from said first portion of each horizontal scan period between said horizontal synchronizing pulses, said second portion being approximately equal to the second one-third portion of said scan.

References Cited

UNITED STATES PATENTS

| | | | |
|---|---|---|---|
| 3,256,386 | 6/1966 | Morchand | 178—6.8 |
| 3,263,027 | 7/1966 | Beltrami | 178—6.8 |
| 3,352,966 | 11/1967 | Sawazaki | 178—6.8 |

FOREIGN PATENTS

| | | |
|---|---|---|
| 755,824 | 8/1956 | Great Britain. |

ROBERT L. GRIFFIN, Primary Examiner

JOSEPH A. ORSINO, Jr., Assistant Examiner

U.S. Cl. X.R.

178—6